I. C. WOODWARD.
NUT BLANK AND LOCKING NUT.
APPLICATION FILED JAN. 13, 1921.

1,416,087.

Patented May 16, 1922.

Inventor:
Irving C. Woodward
By Rummler & Rummler
Attys.

Witness:

UNITED STATES PATENT OFFICE.

IRVING C. WOODWARD, OF SYRACUSE, NEW YORK, ASSIGNOR TO EUGENE A. WOODWARD, OF IRON MOUNTAIN, MICHIGAN.

NUT BLANK AND LOCKING NUT.

1,416,087.  Specification of Letters Patent.  Patented May 16, 1922.

Application filed January 13, 1921. Serial No. 436,861.

*To all whom it may concern:*

Be it known that I, IRVING C. WOODWARD, a citizen of the United States of America, and a resident of Syracuse, county of Onondaga, and State of New York, have invented certain new and useful Improvements in Nut Blanks and Locking Nuts, of which the following is a specification.

This invention relates to nut blanks and locking nuts which in appearance may be like a castle nut except that the boss on one face is not slotted as usual to receive a cotter pin but is provided with an annular groove on its side. The slotting operations and drilling of the bolt which receives the nut are therefore omitted and the groove in the boss is cut by the screw machine which forms the blanks from hexagonal or other stock. The blanks are threaded as usual but after the threading operation the blank is subjected to a pressure which is sufficient to reduce the distance between turns of the thread at the point opposite the groove while not affecting the normal distance between thread turns to any appreciable extent at either side of the groove. The finished product is therefore a nut having a thread which is distinguishable from other threads by being divided into two groups which are brought together a slight distance at the point of the groove by compression of the nut in the direction of its axis.

An object of the invention is to provide a locking nut having threaded portions which oppose each other in locking engagement with the coacting bolt by the groups of turns of the thread of the nut frictionally engaging on opposite sides of the threads on the bolt. A further object of the invention is to reduce the cost and number of manufacturing operations normally required in manufacturing an effective locking nut.

An illustrative embodiment of the invention is shown in the accompanying drawings, in which—

Many prior forms of locking nuts require operations which increase the normal cost of manufacture or depart to an undesirable extent from standard construction. The aim of the present design is to provide an effective locking nut with a minimum of change over standard nuts of the non-locking type.

Figure 1:
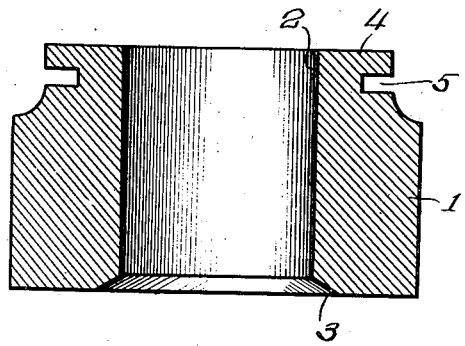
Fig. 1 is a sectional view of a nut blank formed according to this invention.
Figure 2:
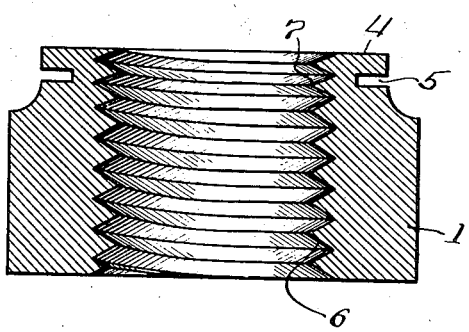
Fig. 2 is a similar sectional view showing the blank provided with a thread and compressed to reduce the distance between the turns of the thread at the point of the annular groove.
Figure 3:
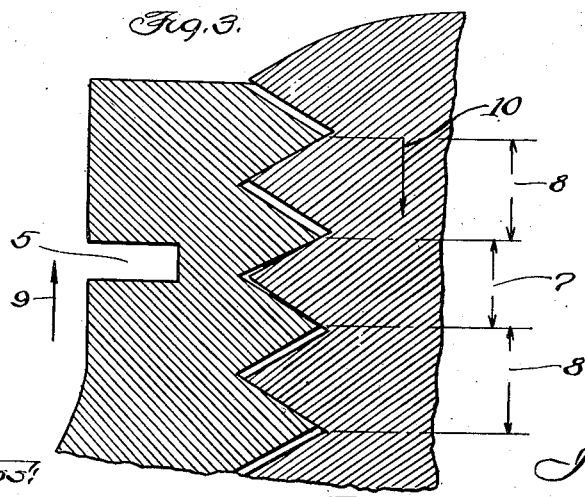
Fig. 3 is an enlarged fragmentary detail showing how the thread of the nut coacts with the thread of the bolt.

The blanks may be made the usual way. The body 1 of the blank has the usual central cylindrical aperture 2, and is preferably beveled at the tap-receiving end 3. The boss 4 at the opposite face of the nut is grooved annularly at 5. After the blank is formed, as shown in Fig. 1, it is tapped as usual for the purpose of cutting any one of the standard threads 6 on the face of the bore 2. The nut is then compressed endwise by a blow in a punch press, or pressure which corresponds with the size of the nut, sufficient to slightly reduce the distance between turns of the thread at the point 7 opposite the annular groove 5. As indicated in Fig. 3, the dimension 7 is less than the dimension 8 which is the normal distance between turns of the thread on either side of the groove 5. The thread of the nut is thus divided into two opposed groups by a point of compression.

When the nut is applied to a bolt it may be screwed on with little resistance until the turn or turns of the thread of reduced pitch engage the thread of the bolt, after which it must be wrenched into position. When the nut is screwed into position to engage the parts being held together, the reactance of the pressure of the nut is in the direction indicated by the arrow 9, whereas the reactance of the bolt on the nut is in the direction indicated by the arrow 10. Accordingly, the two groups of turns of the thread engage the thread of the bolt on opposite sides, as exaggeratedly shown in Fig. 3. All turns of the thread between the base of the nut and the point of compression therefore serve to hold the nut against the reactance of the parts being held together as usual, whereas the turns of the thread on the opposite side of the point of compression are a group which function to lock the nut by opposition to the remaining group.

Although but one specific embodiment of this invention has been herein shown and described, it will be understood that numerous details of the construction shown may be altered or omitted without departing from the spirit of this invention as defined by the following claims.

I claim:

1. A nut with a thread having two groups of turns of substantially equal pitch joined together by a group of turns having a different pitch.

2. A threaded nut having an annularly grooved boss on one face and compressed in the direction of its axis, whereby the distance from turn to turn of the thread is less near said groove than the normal distance between the remaining turns of the thread.

3. A threaded nut having an annular groove between its ends, and compressed in the direction of its axis, whereby the distance from turn to turn of the thread is less near said groove than the normal distance between the remaining turns of the thread.

Signed at Chicago this 10th day of Jan. 1921.

IRVING C. WOODWARD.